United States Patent [19]

Rosenblatt et al.

[11] 4,262,529

[45] Apr. 21, 1981

[54] PRESSURE SENSITIVE INDICATING DEVICE

[75] Inventors: Aaron A. Rosenblatt, New York; Walter J. Mann, Little Neck, both of N.Y.

[73] Assignee: James C. Adkins, Chappaqua, N.Y.

[21] Appl. No.: 48,092

[22] Filed: Jun. 13, 1979

[51] Int. Cl.³ .............................................. B60C 23/04
[52] U.S. Cl. ................................... 73/146.8; 137/227; 73/730; 116/34 R; 116/DIG. 8
[58] Field of Search ............... 137/227, 232; 73/146.2, 73/146.3, 146.8, 730, 731, 744; 116/34 R, 270, DIG. 7, DIG. 8, 41; 128/207.15

[56] References Cited

U.S. PATENT DOCUMENTS

| | | | |
|---|---|---|---|
| 3,536,026 | 10/1970 | Miller | 73/146.3 X |
| 3,670,688 | 6/1972 | Seaberg | 73/146.8 X |
| 4,018,231 | 4/1977 | Wallace | 128/207.15 |
| 4,134,407 | 1/1979 | Elam | 116/270 X |
| 4,185,638 | 1/1980 | Bruner | 128/207.15 X |

Primary Examiner—Harold W. Weakley
Attorney, Agent, or Firm—Mandeville and Schweitzer

[57] ABSTRACT

The disclosure relates to a pressure sensitive indicating device of extremely simplified nature, providing a visual indication of a predetermined pressure threshold level. A typical and advantageous form of the device is a valve or valve extension member for a pneumatic tire, providing a visual indication of the existence or not of a desired pressure level. The device, in its most basic form, comprises an element formed of a natural or synthetic deformable elastomer, designed to expand upon exposure to increasing pressure levels. A covering element is associated with the deformable elastomer and is displaced by distention of the elastomer. By providing the deformable elastomer in a distinctively different color than the cover element, the displacement of the cover upon pressurization to a desired threshold, is readily evident to the observer.

3 Claims, 8 Drawing Figures

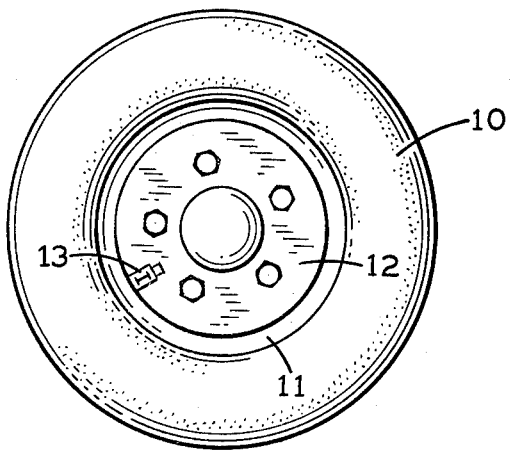
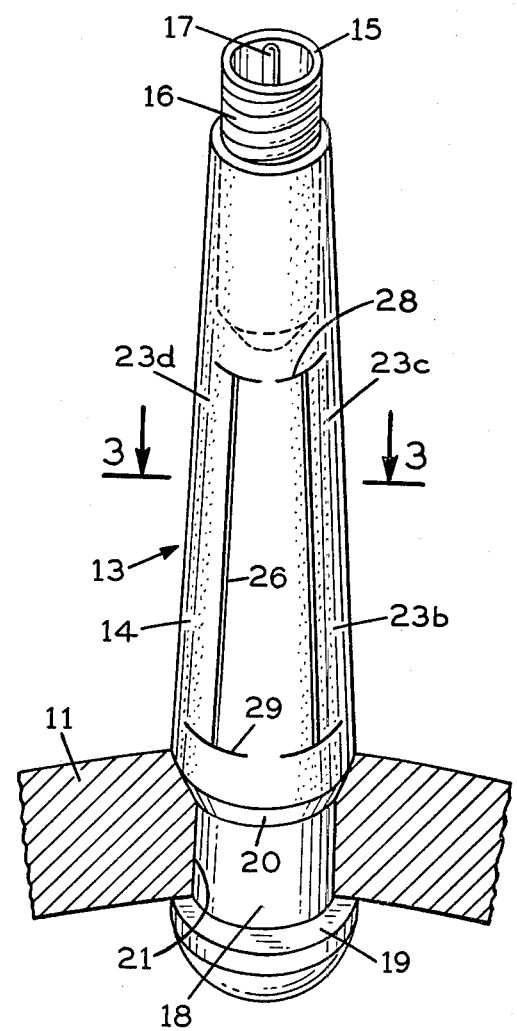
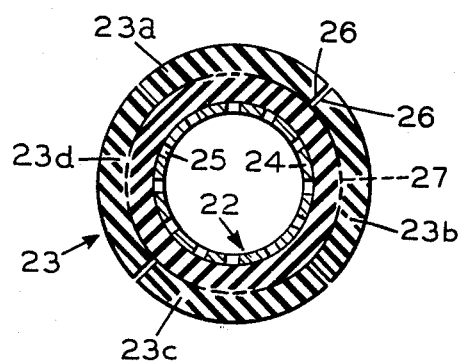
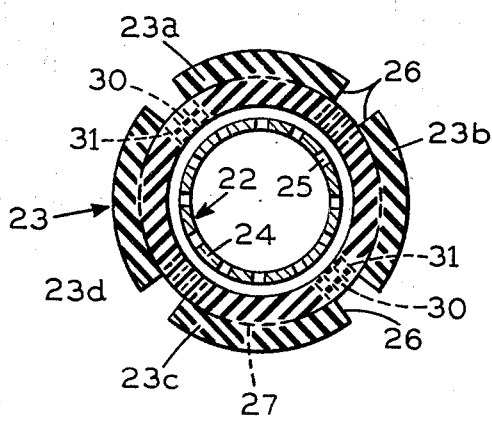
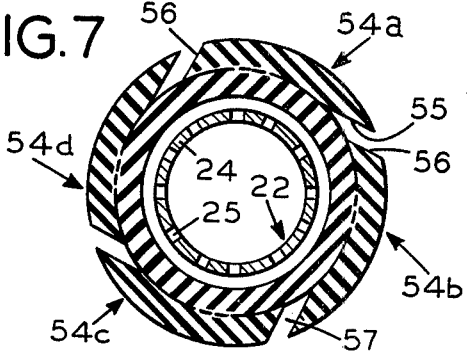

PRESSURE SENSITIVE INDICATING DEVICE

BACKGROUND AND SUMMARY OF THE INVENTION

Although the invention is by no means limited to use in connection with pneumatic tires, it finds one of its most advantageous uses as a pressure indicating device forming a part of the valve stem of a pneumatic tire and thus forming in effect an integral part of the inflated tire. As will be apparent hereinafter, however, the basic concepts of the invention are applicable to a wide range of pressure indicating functions.

It is well known, of course, that proper inflation of pneumtic tires is not only essential to a realization of adequate tire life, but also to the obtaining of optimum fuel efficiencies. In addition, maintenance of adequate tire inflation, can be quite important from a safety standpoint. Typically, the determination of proper inflation pressure in a tire involves considerable inconvenience to the average vehicle owner, and often requires a special trip to a service station. As a result, drivers tend to be neglectful of maintaining proper day-to-day tire inflation.

It has been proposed heretofore to provide pressure measuring devices either for attachment to the valve stem of the tire or for direct incorporation into the valve stem, to simplify the task of regular tire pressure maintenance. While the concept of such devices has been constructive, none has found widespread acceptance with the public because of various shortcomings, such as excessive cost, lack of adequate durability under the service conditions, etc.

In accordance with the present invention, a novel and improved pressure indicating device is provided which is uniquely adapted for incorporation into, for example, the valve stem of a pneumatic tire and/or a valve stem extension. The device of the invention is of such a simplified nature as to be capable of incorporation into a valve stem or extension at extremely low cost appropriate for high volume, cost conscious markets. In addition, and equally as important, the device of the invention is extremely rugged and durable and easily capable of withstanding the service conditions to which the pneumatic tires of a typical motor vehicle are exposed.

In accordance with a more specific aspect of the invention, a novel and improved pressure indicating device is provided which comprises a pressure distensible member, formed of natural or synthetic deformable elastomer. The distensible member advantageously may be a liner of a tubular tire valve stem. In conjunction with a deformable elastomer is a cover member which, in the case of a valve stem, advantageously is in the form of a relatively stiff, tough tubular cover surrounding and supporting the deformable elastomer. The cover member is bonded to the deformable elastomer in limited areas and is formed with discontinuities, typically vertical slits, in selected, unbonded areas. When the deformable elastomer is in a contracted condition, the slits or other discontinuities in the outer cover are closed or substantially closed. However, when the elastomer is exposed to increasing pressures, it will distend causing the cover to separate at the discontinuities. In accordance with the invention the deformable elastomer and cover may be of distinctively different colors, so that the distended condition of the deformable element is readily observable after a predetermined pressure threshold is reached.

In accordance with the invention, the pressure threshold at which the device provides a visible indication of change may be readily varied to suit desired end results by appropriate selection of the elastomer in the first instance and by controlling the physical dimensions and configuration of the component parts.

In one highly specific form of the invention, the indicating device is incorporated directly into a valve stem of a type designed for insertion into a motor vehicle wheel rim, for association with a conventional tubeless tire, for example. In another specific form, the device may be incorporated into an extension device, which attaches to an otherwise conventional valve stem. In the latter case, the desired pressure threshold of a tire may be quickly changed by exchanging extension elements.

In its broadest concepts, the device of the invention may be applied in a wide variety of ways for the detection and indication of predetermined pressure thresholds in any kind of pressure vessel or containment.

For a more complete understanding of the above and other features and advantages of the invention, reference should be made to the following detailed description of a preferred embodiment and to the accompanying drawings.

DESCRIPTION OF THE DRAWINGS

FIG. 1 is an elevational view of a typical motor vehicle pneumatic tire, incorporating a valve stem according to the invention.

FIG. 2 is an enlarged perspective view of the valve stem shown in FIG. 1, with the indicator in a closed (inadequate pressure) position.

FIG. 3 is a cross sectional view along line 3—3 of FIG. 2.

FIG. 5 is a cross sectional view along line 5—5 of FIG. 4.

FIG. 7 is a cross sectional view, similar to FIG. 5, illustrating an additional modified form of the invention.

DESCRIPTION OF A PREFERRED EMBODIMENT OF THE INVENTION

Figure 4:
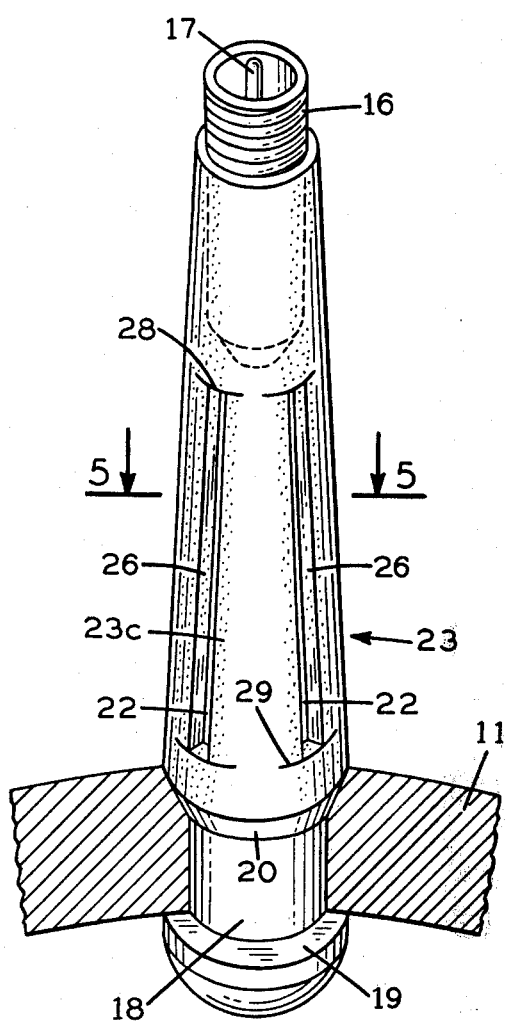
FIG. 4 is a perspective view of the valve stem, with the indicator in the open (adequate pressure) position.

Referring now to the drawings, the reference numeral 10 indicates a generally cnventional form of motor vehicle pneumatic tire, mounted on the rim 11 of a wheel 12. In accordance with known practice, a valve stem element generally designated by the numeral 13 is inserted through an opening provided therefor in the wheel rim 11, providing a valved passageway into the tire for pressurization.

Pursuant to generally conventional construction, the valve stem 13 (see FIG. 2) includes an elongated tubular stem body 14 of tubular cross section. At its upper end, the stem body mounts a valve assembly 15 of conventional construction, consisting of a threaded tubular collar 16 and a valve mechanism (not shown) normally held in a closed position but openable upon axial depression of a valve actuating pin 17. At its base end, the stem body is annularly recessed at 18, forming spaced, oppositely facing inner and outer annular shoulders 19 and 20. The base portion of the stem body is adapted to be forcibly inserted into an opening 21 in the wheel rim 11, such that the valve stem 13 is securely mechanically held in position by the flanges 19, 20 and maintained in tightly sealed relation with the wheel rim 11 by the tight fitting relation of the resilient material of the stem body.

In accordance with the invention, the stem body 14 is of a composite construction, including an inner, distensible tubular liner 22 and an outer cover 23. When the device is properly assembled on a pneumatic tire or other pressure containing means, the distendable liner 22 is exposed to the contained pressure fluid and subjected to its forces. Accordngly, the contained pressure will tend to expand the liner 22 circumferentially and radially. In most cases, it is desirable to provide for a certain degree of mechanical support for the distendable liner 22. In the illustrated device, such mechanical support is provided in the form of an internal metal tube 24, which is surrounded by the liner 22. At least in a predetermined area, the metal tubular support 24 is provided with perforations 25, such that the deformable liner 22 remains exposed to the contained pressure fluid.

As reflected in FIG. 3, the cover element 23, which surrounds the deformable elastomeric liner 22, is divided into a plurality of segments 23a-23d, each separate from the others. In the form of the invention shown in FIGS. 1-5, there are, for example, four cover segments, each covering an arc of about 90 degrees and extending axially over a substantial portion of the stem body, from a region above the base portion and extending substantially to the region of the valve element 15. In the under pressurized condition of the device, the end edges 26 of the cover segments substantially abut, such that the cover 23 appears to the eye to be more or less continuous.

As reflected in FIG. 3, the cover segments 23a-23d are bonded to the deformable liner 22 along limited portions 27, extending axially along the center of the segments. The margins of the cover segments, on opposite sides of the bonded center strip, directly overlie but are free of attachment to the liner. As reflected in FIGS. 2 and 4, for example, the upper and lower extremities of the cover segments are defined in part by transverse slits 28, 29.

The cover 23 may be formed of the same material as the distensible liner 22, but more typically is constructed of a somewhat harder, stiffer material, in order to provide additional mechanical support for the liner 22. In some cases, it may be desirable or appropriate to omit the metallic tubular internal support 24, and rely primarily upon the stiffness of the cover 23 to provide mechanical support for the liner.

When the device of FIGS. 1-5 is installed in a wheel and tire assembly, as reflected in FIG. 1, and air under pressure is introduced into the tire through the valve stem, the tubular liner 22 will be exposed to progressively higher pressures as tire inflation continues. As pressure increases the cover will tend to open in the regions in which the cover 23 is formed with the longitudinal slits. As this expansion occurs, the normally substantially abutting end edges 26 become separated, as shown in FIG. 5, exposing an axially elongated surface area of the distensible liner 22. In the first described form of the invention, the liner 22 is formed with longitudinal bands of distinctively different colors. A central band 30 is of the same color as the cover material, and bands 31 on either side of the central band are of a contrasting color. Accordingly, when the liner is initially expanded to reveal only the like-colored central band 30, there is no highly visible change. However, when the liner expands further, to the condition shown in FIG. 5, the distinctively colored indicator bands 31 are easily visible through the separated cover edges 26, making it readily evident to the casual observer that the tire 10 has been inflated to a predetermined pressure threshold. If desired, a further set of color bands (not shown) may be formed outside of the bands 31, to indicate an over-pressure condition.

The pressure at which the expanding liner 22 will reveal a distinctively different color band may be readily controlled by proper formulation of the deformable elastomer of which the liner is formed and/or by the location of the color bands 30,31. These may be worked out empirically to provide a desired threshold of response in a given device.

Figure 6:
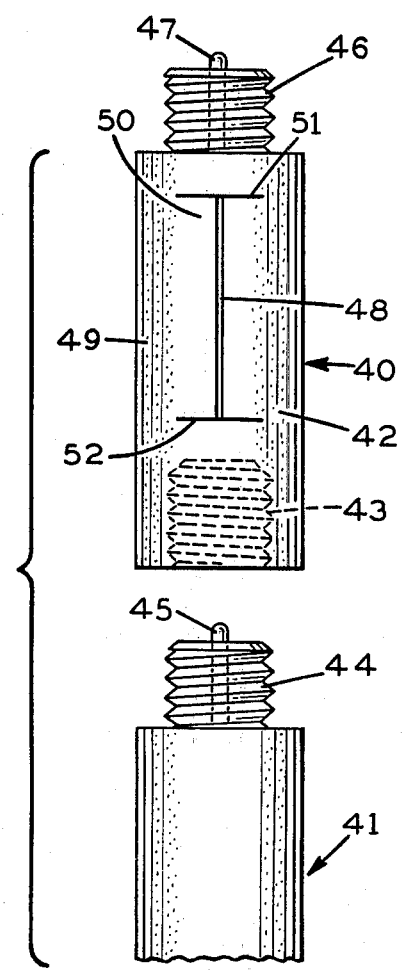
FIG. 6 is a plan view of a modified form of the invention, in which the pressure indicator is incorporated in a valve extension adapted for attachment to an otherwise conventional valve stem.

In the modification shown in FIG. 6, a pressure indicating device of the general nature illustrated in FIGS. 1-5 is incorporated into a valve extension device 40, which is arranged to be attached to a valve stem 41. The valve stem 41 may be either of a wholly conventional nature, or may if desired be of the type shown in FIG. 1-5, provided with a built-in pressure indicating feature. Valve extensions per se are, of course, well known. In general they include an extension body 42 provided at its lower end with an internally threaded fitting 43 arranged to be received over the male threads 44 of the valve stem. The extension fitting 43 includes conventional provisions (not illustrated) for depressing the valve plunger 45 when the extension is assembled to the valve stem 41. The extension in turn is provided with its own valve assembly and plunger 46, 47 at its outer end, so that the assembled valve stem 41 and extension 40 function effectively as an elongated valve stem.

In accordance with the invention, the valve extension 40 is provided with a body section of a construction corresponding in general to the stem body portion of the device of FIGS. 1-5. Thus, a cross section taken through the line 3—3 of FIG. 6 would correspond closely to the cross section illustrated in FIG. 3, for example, of the drawing, there being an internal liner 48 of a natural or synethic deformable elastomer surrounded by a segmented cover 49. The cover 49 is constructed of a plurality of individual, disconnected segments, bonded to the liner along limited, axially extending areas and having flap-like sections 50 at each edge bounded by upper and lower slits 51, 52 and axially extending slits 53.

The operation of the extension device is identical to that of the valve stem of FIGS. 1-5. When the interior of the extension member is exposed to a predetermined threshold pressure, the liner expands to separate the cover segments and makes visible axial bands of the liner material, advantageously formed of a contrastingly colored material to the color of the cover material.

In the form of the device shown in FIG. 6, the pressure-indicating extension may be easily attached to otherwise conventional valve stems, to convert existing, conventional equipment. The use of the threshold-indicating extension devices also facilitates changing the desired pressure threshold at which a tire is to be operated, for example.

In the modification of FIG. 7, the cover segments 54a-54d are formed with their side edges 55, 56 disposed at a substantial angle with respect to the radius lines projected from the center of the valve stem. When the deformable liner 22 is under minimum pressure, and is therefore in a contracted condition, the angular edges 55, 56 of adjacent cover segments are circumferentially overlapped and in contact or nearly so. As the internal pressure on the liner increases, the cover segments 54a–54d are gradually separated, providing for a progressively increasing gap width 57 between adjacent cover segments. However, because of the circumferential overlap between the adjacent segments, the underlying liner does not become readily visible until the pressure has reached a predetermined threshold. Thus, in the case of the embodiment of FIG. 7, the liner 22 may be formed in its entirety of a distinctively different color than the cover segments. Nevertheless, the distinctive color of the liner will not become noticeable until a certain threshold has been reached.

In any of the before described forms of the invention, it may also be possible to pretension the liner 22 over the relatively nonelastic internal perforated tube 24. In such cases, distention of the liner 22 in response to increasing internal fluid pressure will not commence until the level of pretension has been exceeded.

Figure 8:
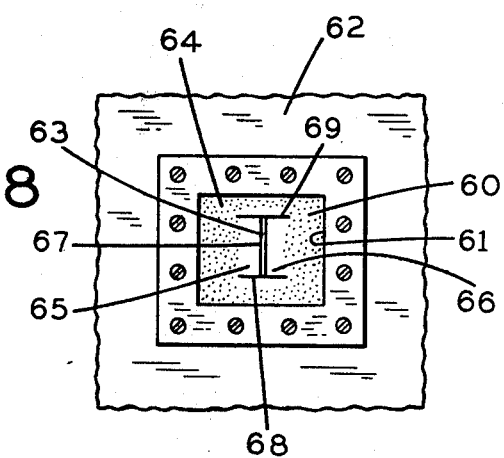
FIG. 8 is a fragmentary plan view of a still further modification of the invention, in which the indicator forms a portion of the wall of a pressure vessel.

The principles of the invention are by no means limited to incorporation in valve stems and extensions for pneumatic tires but may be utilized in a virtually unlimited range of applications where a convenient pressure threshold indication may be desired. In the modification of FIG. 8, for example, a flat panel 60 of elastomeric material is clamped or otherwise secured in a window 61 formed in the wall of a closed pressure vessel 62. The panel 60 has an inside liner 63, formed of natural or synthetic deformable elastomer. The liner is secured in limited areas to a deformable cover layer 64, provided in the center portion of the panel with flap-like sections 65, 66, which are free of the underlying liner 63 and are defined by slit 67–69. When the closed vessel 62 is pressurized, the pressure within the vessel acts upon the panel 60, tending to distend it outward. As pressure is increased, the liner material tends to distend progressively. The opposed edges of the flap-like sections 65, 66, which are normally in substantially abutting or overlapping relation, are thus caused to separate, uncovering a strip-like section of the underlying liner material, which may be formed of a distinctively different colored material to facilitate visual observation of the pressure condition.

The invention is capable of an extremely wide variety of applications, for indicating a desired pressure condition, of which the foregoing are merely illustrative and not in any way limiting. Utilization of the new principle in a pneumatic tire valve stem or valve stem extension, for example, is particularly advantageous, however, because the indicating device may be incorporated at extremely low cost, and is ideally suited to the severe service conditions encountered.

In view of the many and varied forms which the invention may take, reference should be made to the following appended claims in determining the full scope of the inventive concept.

What is claimed is:

1. A valve stem or valve stem extension device for a pneumatic vehicle tire, or the like, which comprises
   (a) a base suitable for attachment to a vehicle wheel or a valve stem,
   (b) a stem body mounted in communication with fluid within the tire and including a relatively rigid tubular support,
   (c) said stem body further including a tubular distensible member formed of a deformable elastomer having predetermined distension characteristics surrounding said tubular support,
   (d) said distensible member forming an expandable liner of said stem body and being subjected to the pressure within the tire.
   (e) said distensible member being confined against expansion in axially spaced regions and being expandable between said regions,
   (f) axially extending cover means normally completely surrounding at least the expandable portion of the distensible member and extending axially beyond each end of said expandable portion,
   (g) said cover means comprising a discontinuous generally tubular member displaceable by expansion of said distensible member,
   (h) said cover means being fixed in relation to the stem body in limited areas and having at least one movable free edge,
   (i) said movable free edge being displaceable by expansion of said distensible member to indicate pressure conditions in said tire.

2. The device of claim 1, wherein said tubular support comprises a perforated metal tube.

3. The device of claim 1, further characterized by
   (a) portions of said means including said movable free edge being in overlapping relation to other portions of said cover means.

* * * * *